United States Patent
Morimatsu et al.

(10) Patent No.: US 6,614,943 B1
(45) Date of Patent: Sep. 2, 2003

(54) METHOD OF IMAGE BINARY CODING AND IMAGE BINARY CODING APPARATUS

(75) Inventors: Hiroyuki Morimatsu, Fukuoka (JP); Michiteru Shichiro, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/364,458

(22) Filed: Jul. 30, 1999

(30) Foreign Application Priority Data

Jul. 30, 1998 (JP) .......................................... 10-215241
Mar. 30, 1999 (JP) .......................................... 11-088770

(51) Int. Cl.$^7$ .......................... G06K 9/40; G06K 9/00; H04N 1/46; G03F 3/08
(52) U.S. Cl. ........................ 382/252; 382/275; 382/274; 382/165; 382/164; 358/519; 358/518; 358/515
(58) Field of Search ................................. 382/255, 274, 382/275, 245, 247, 248, 163, 164, 167, 282, 294, 295, 190, 201, 219, 220, 252; 358/501, 512, 515, 518, 519, 1.9, 3.04, 534

(56) References Cited

U.S. PATENT DOCUMENTS

| | | | | |
|---|---|---|---|---|
| 5,079,624 A | * | 1/1992 | Sasuga et al. | 358/75 |
| 5,414,529 A | * | 5/1995 | Terada et al. | 358/448 |
| 5,481,372 A | * | 1/1996 | Kouno et al. | 358/433 |
| 5,729,624 A | * | 3/1998 | Tanioka et al. | 382/162 |
| 6,099,105 A | * | 8/2000 | Kakutani | 347/15 |
| 6,215,561 B1 | * | 4/2001 | Kakutani | 358/1.9 |

* cited by examiner

Primary Examiner—Bhavesh M. Mehta
Assistant Examiner—Yosef Kassa
(74) Attorney, Agent, or Firm—RatnerPrestia

(57) ABSTRACT

A multi-gradation image having a plurality of colors is binary coded by processing halftones in a pseudo manner. After the binary coding, an undesirable overlaying of colors on the image is eliminated so that image quality can be improved and also process load can be alleviated. A detailed process is this: Colors at a target pixel are binary coded, and the results are retained as data. When a color following the color already binary coded is processed, the retained data of the preceding color is referred to, thereby avoiding an undesirable composite black due to an overlaying of three primary colors on the same pixel. When the colors of an input image include black (K), this K is firstly binary coded at the target pixel, and when K is output, the other colors are halted outputting or a threshold value is set so that the other colors are not output. When K is not output, the other colors are binary coded in the order of higher density or higher visual sensitivity so that a quality image can be output.

6 Claims, 9 Drawing Sheets

FIG. 9 PRIOR ART

|   | 7 |
|---|---|
| * | 5 |
| 1 | 3 |

METHOD OF IMAGE BINARY CODING AND IMAGE BINARY CODING APPARATUS

FIELD OF THE INVENTION

The present invention relates to an image binary coding method that is employed in printers, scanners, copying machines, facsimile machines and the like, and the method can reproduce a multi-gradation-image into a binary gradation image.

BACKGROUND OF THE INVENTION

The error-diffusion method is known as one of the methods converting a multi-gradation image into a binary-gradation image.

The principle of the error diffusion method is to display halftones of image in a pseudo manner into binary gradation depending on a number of dots per unit area.

FIG. 8 is a block diagram illustrating a circuit embodying a conventional error-diffusion-method.

In FIG. 8, multi-gradation data "D" of a target pixel that is to be binary coded is read out from image memory 1. The data "D" undergoes γ(gamma) correction by referring to the correction data stored in γ(gamma) correction ROM 2, and are corrected to multi-gradation data D' responsive to printing characteristics of output devices such as printers and the like. Adder 3 of error diffusion device 8 adds an error data "E" of this target pixel to the corrected multi-gradation data D', then adder 3 outputs the data "F" of target pixel, i.e. F=D'+E.

Data "F" including the error data of the target pixel is compared with a threshold value "Th" at the binary coding in comparator 5. In a case of F ☐Th a binary signal B="1" is tapped off, and in a case of F<Th, a binary signal B="0" is tapped off. Based on this output, error E produced in the binary coding process is calculated by subtracter 7 as E=F−B'.

When input data has 256 gradations (0–255), B'=B×255 is found. Therefore, e.g. in a case of error-weighted input multi-gradation data F=230 and threshold value Th=128, output data after binary coding is B=1, and thus the error is E=F−B×255=230−1×255=−25.

This error E is weighted by weighting-error-calculator 6 according to a given error matrix Mxy, then the weighted error is stored in error memory 4 for being diffused to pixels data that are to be processed subsequently.

The weighted error data are added to the multi-gradation data of a subsequent pixel by the adder 3, whereby the error data can be diffused.

In this example, when input multi-gradation data is D=230, the output data after binary coding is "1", i.e. "255" of the 256 gradations resulting from the comparison of the input multi-gradation data with threshold value Th=128. Thus, the error=25 is produced with regard to the input multi-gradation data D=230. As a result, the error=25 is an error of the input multi-gradation data D=230. This error is weighted by weighting-error-calculator 6 with an error matrix, then is stored in error memory 4 to be reflected to the subsequent binary coding for unprocessed pixels.

Figure 9:
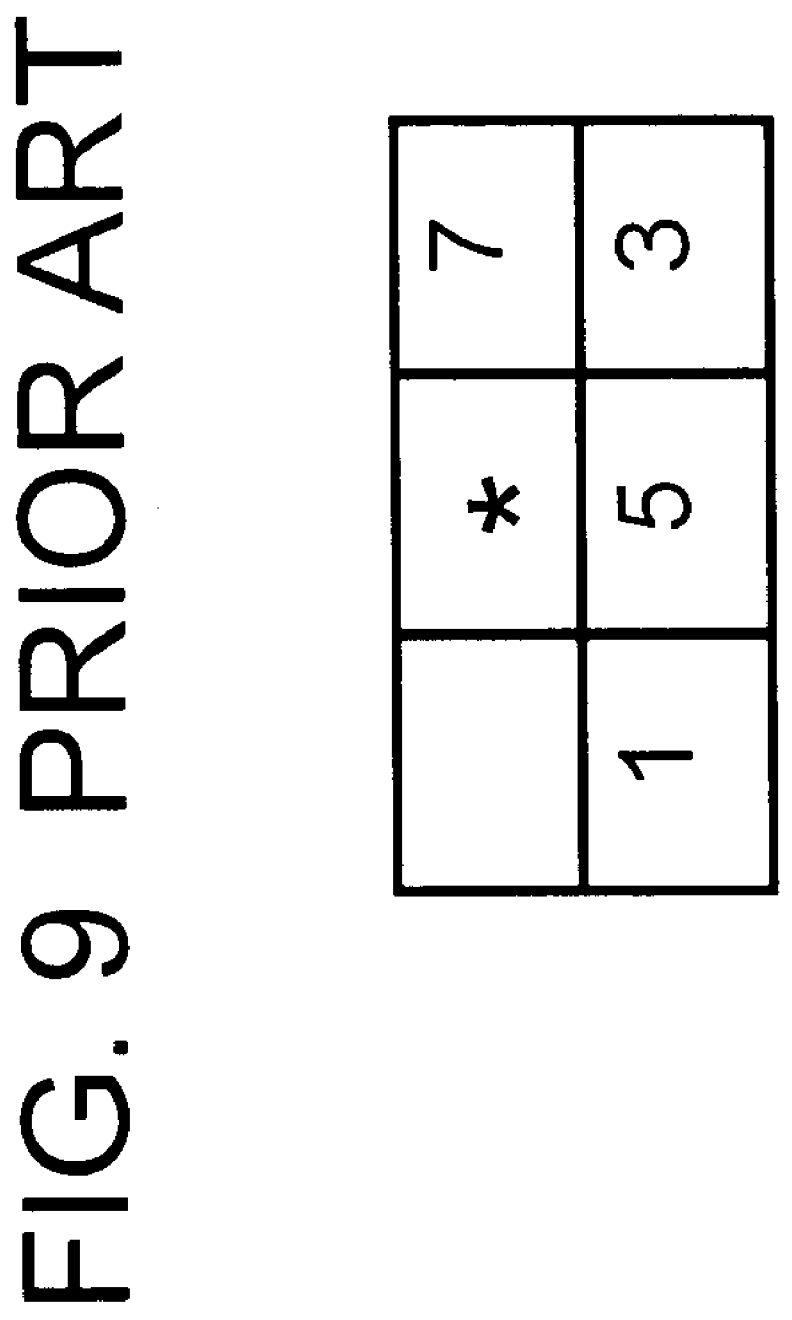

FIG. 9 shows an example of the error matrix Mxy employed in the conventional error diffusion method. In FIG. 9, a target pixel in present is marked with * symbol, and the binary coding is provided to this target pixel. The error produced in the binary coding of this target pixel is weighted by the weighting coefficients (7,1,5,3) shown in FIG. 9, then is diffused to the subsequent unprocessed pixel. The weighted error is stored in error memory 4 as an error distribution value. When the subsequent pixel is binary coded, the error distribution value stored in error memory 4 is read out, and the subsequent input value read out from the image memory 1 is corrected with this error distribution value.

As described above, according to the error diffusion method, a binary coded error, which is produced in a binary coding process provided to a pixel, is diffused (distributed) to the subsequent pixel data to be binary coded. This method tries to minimize an error between the image data after the binary coding and that before the binary coding.

This error diffusion method distributes a binary-coded-error in sequence to unprocessed pixels to be binary coded, so that the original image in multi-gradation can be displayed in binary gradation having dot-densities.

On the other hand, in the image displayed in binary gradation by the error diffusion method, the binary coding results in "1" or "0" depending on the error distribution. The result depends on a kind of probability, thus an undesirable binary-coded result can be output as follows.

1. Composite black can be happened in a low density area of an image. The composite black indicates a phenomenon where a first color, a second color and a third color, which should not have been printed simultaneously, are printed at the same dot thereby producing black color. The composite black in a low density area increases substantially the granularity of the image, whereby the image undergone the binary coding is degraded.

2. In the case where an input image includes black (K), black (K) that should not have been printed is overlaid on the dots illuminating colors other than black such as cyan, magenta, yellow. This phenomenon invites color overlay with ease. In other words, dots which should have illuminated colors other than black are concealed by black (K), so that the colors in original image cannot be reproduced exactly. As a result, the display undergone the binary coding is degraded.

Further, since the error diffusion method involves matrix calculation for error diffusion process in each pixel and color, the calculations impose a substantial load to the error diffusion device.

SUMMARY OF THE INVENTION

The present invention addresses the problems discussed above and aims to provide a method of binary coding which can avoid overlaying colors components on a dot.

In the following description, ON or OFF of a color indicates that a binary coded output of a color is "detective" or "non-detective" in an output image. Further, colors components displaying an image are converted from red (R), green (G), and blue (B) into cyan (C), magenta (M), yellow (Y) and black (K) before undergoing the binary coding. The respective colors are represented by (R), (G), (B), (C), (M), (Y) and (K) hereinafter.

The present invention is not limited to the binary coding of (C), (M), (Y) and (K), but can be applied to the binary coding of other three primary colors.

When a multi-gradation-image is binary coded by processing halftones in a pseudo manner, the image-binary-coding-method of the present invention can avoid overlaying the respective dots of first, second and third colors on a target pixel by retaining the binary-coded-results, i.e. ON or OFF, of the first and second colors. In other words, when the binary-coded-result of the first color is ON, the result of the second color is forced to be OFF. When either one of results of first and second colors is ON, the result of third color is forced to be OFF, of whereby overlaid printing of first, second and third colors can be restrained.

If the input image includes (K), (K) firstly undergoes binary coding in the target pixel. When the result is ON, the binary-coding-results of (C), (M) and (Y) are output as OFF. In this case, the colors other than (K) in the target pixel are forcibly output as OFF, which seems to lower the reproduced image quality; however, the error diffusion method distributes errors, whereby (C), (M) and (Y) are output as ON in other pixels. As a result, the image can be correctly reproduced. When the binary coding of (K) results in OFF, other colors are binary coded in the order of higher density by caring that (C), (M) and (Y) have little chances to overlie with each other on the target pixel. Further, the characteristics of human eyes are taken into consideration, and binary coding is provided accordingly to (M), (C) and (Y) in this order, i.e. the order of higher visual sensitivity by caring that (M), (C) and (Y) have little chances to overlie with each other on the target pixel.

When a color is output as OFF, the matrix calculation for error diffusion can be omitted, thereby shortening a process time.

BRIEF DESCRIPTION OF THE DRAWINGS

FIG. 9 illustrates an error matrix used in the conventional error diffusion method.

DETAILED DESCRIPTION OF THE PREFERRED EMBODIMENT

The following embodiments describe the binary coding through an error diffusion method, where data comprising cyan (C), magenta (M), yellow (Y) and black (K) converted from red (R), green (G) and blue (B) are binary coded.

Exemplary Embodiment 1

The first embodiment is described with reference to FIG. 1. This embodiment has an aim to eliminate overlaying the respective dots of a first and second colors.

Figure 1:
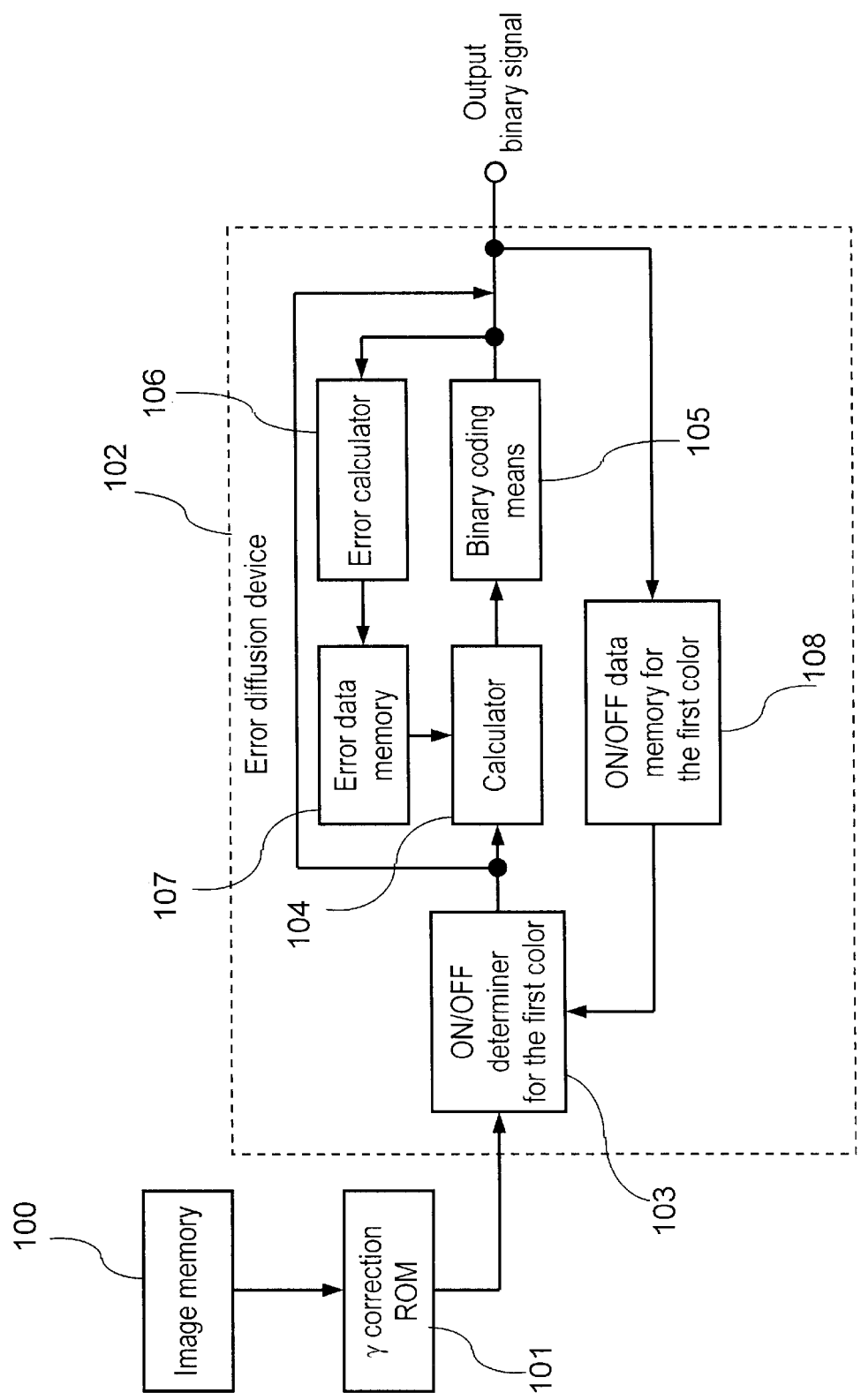
FIG. 1 is a block diagram illustrating the structure of an error diffusion device in accordance with a first exemplary embodiment of the present invention.

FIG. 1 is a block diagram illustrating the error diffusion device in accordance with a first exemplary embodiment of the present invention. Image memory 100 stores image data to be binary coded. This image data undergoes the conversion from R, G, B to C, M, Y, K, and then the data is fed into γ (gamma) correction ROM 101, which includes a conversion table. This conversion table corrects characteristics of image data responsive to characteristics of an output device. The image data undergoes γ correction according to this table, then the data is fed into error diffusion device 102.

Error diffusion device 102 comprises the following elements:
ON/OFF determiner 103 for a first color;
error weighting calculator 104;
binary coding means 105;
error calculator 106;
error data memory 107; and
ON/OFF data memory 108 for the first color.

Determiner 103 refers to data stored in ON/OFF data memory 108, and determines whether the first color is ON or not at a target pixel. Weighting error calculator 104 refers to the errors stored in memory 107 and generated at pixels, which have been binary coded and are around the target pixel, and then provides the image data of the target pixel with error weighting.

Binary coding means 105 refers to a threshold value at binary coding, and provides the weighted data supplied from calculator 104 with binary coding process. The binary coded data is output as a binary signal.

ON/OFF data memory 108 for the first color stores ON/OFF information of the binary coded data regarding the first color. ON/OFF determiner 103 refers to this information.

Error calculator 106 calculates the error of image data binary coded by coding means 105. The error has been produced in this binary coding process. The calculated error data is stored in error data memory 107, and is referred to when an error weighting is practiced in calculator 104.

An operation of error diffusion device 102 constructed as discussed above is detailed hereinafter how to handle the first and second colors.

(1) First, provide the first color with the binary coding in the following procedure. During this process, a process by determiner 103 can be omitted. In the first place, the first color data of a target pixel undergoes error weighting. At this moment, error data of pixels around the target pixel are referred to. Those error data have been stored in error data memory 107 by error weighting calculator 104. The weighted data then undergoes the binary coding through binary coding means 105 based on a given threshold value. Error calculator 106 calculates binary coding errors produced in this process. The calculated errors are stored in memory 107. The result of binary coding of the first color is stored in memory 108 as ON/OFF data.

(2) Second, provide the second color with the binary coding. In the first place, determiner 103 refers to the ON/OFF data stored in memory 108 of the first color. When the first color is ON, the second color is assigned to OFF by error-diffusion-device 102 free from an error diffusion process. When the first color is OFF, the second color undergoes a usual error diffusion process as discussed above, i.e. error data weighting by calculator 104, and binary coding by coding means 105 are provided, then the result is output as a binary signal.

(3) Regarding the third color, the usual error diffusion process is provided, and the result is output as a binary signal without referring to the ON/OFF data of the first color.

Exemplary Embodiment 2

An operation of error diffusion device 102 in accordance with the second embodiment of the present invention is described with reference to FIG. 2. This second embodiment has an aim to eliminate overlaying the respective dots of a first, second and third colors.

In the meantime, the process, where data stored in image memory 100 undergoes γ(gamma) correction and is fed into error diffusion device 102, is the same in every embodiment.

Figure 2:
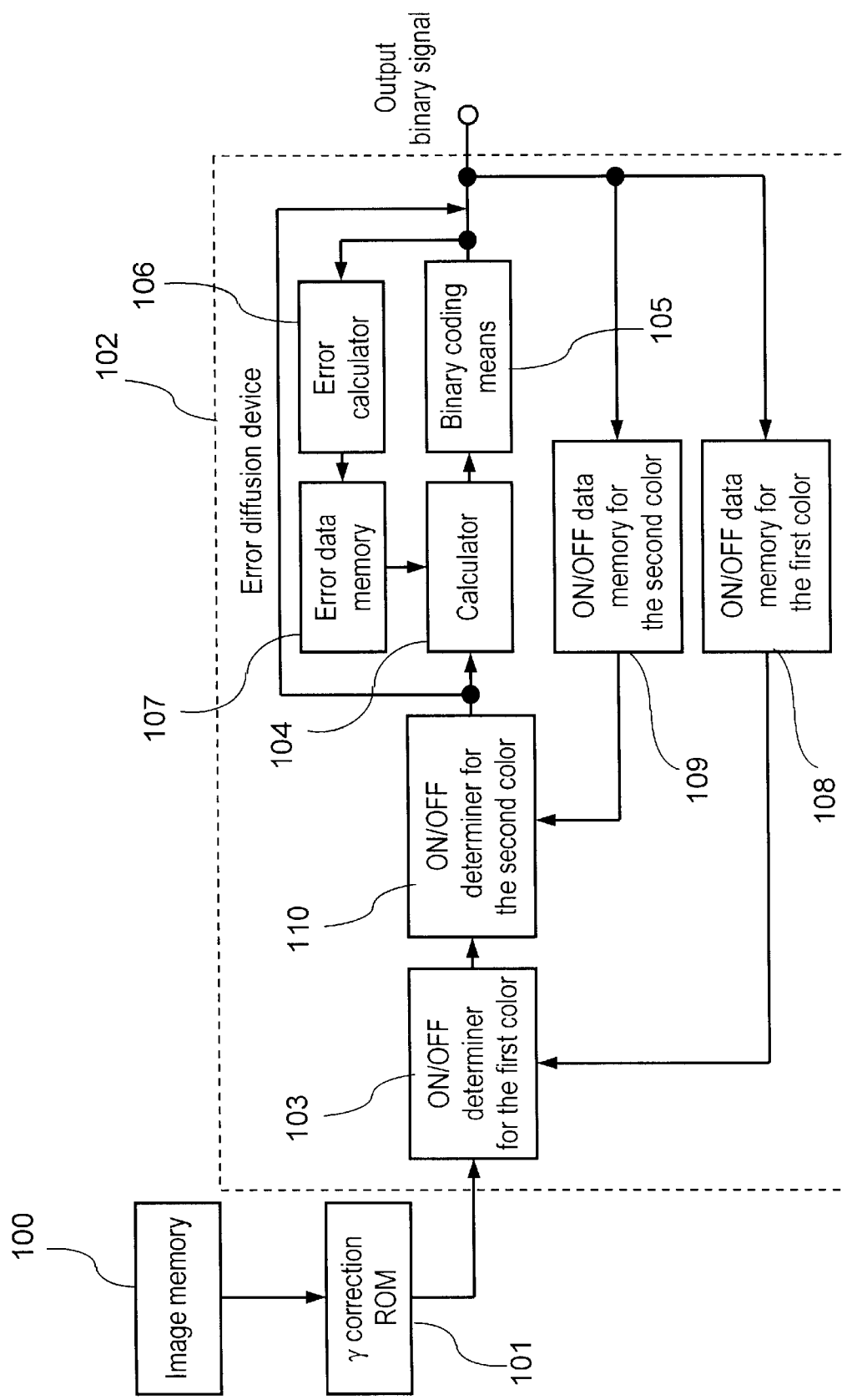
FIG. 2 is a block diagram illustrating the structure of an error diffusion device in accordance with a second exemplary embodiment of the present invention.

In FIG. 2, ON/OFF data memory 109 for the second color and ON/OFF determiner 110 for the second color are added to the structure shown in FIG. 1. Other elements in FIG. 2 are the same ones used in FIG. 1.

The second exemplary embodiment in the construction discussed above is detailed hereinafter.

(1) First, provide the first color with the binary coding in the following procedure. During this process, processes by determiners 103 and 110 can be omitted. In the first place, the first color data of a target pixel undergoes error weighting. At this moment, error data of pixels around the target pixel are referred to. Those error data have been stored in error data memory 107 by error weighting calculator 104. The weighted data then undergoes the binary coding through binary coding means 105 based on a given threshold value. Error calculator 106 calculates binary coding errors produced in this process. The calculated errors are stored in memory 107. The result of binary coding of the first color is stored in memory 108 as ON/OFF data.

(2) Second, provide the second color with the binary coding. In the first place, determiner 103 refers to the ON/OFF data stored in memory 108 of the first color. (a) When the first color is ON, error-diffusion-device 102 assigns the second color to OFF free from an error diffusion process, and outputs an OFF signal. Memory 109 stores this OFF information. (b) When the first color is OFF, the second color undergoes a usual error diffusion process as discussed above, i.e. error data weighting by calculator 104, and binary coding by coding means 105 are provided, then the result is output as a binary signal. Memory 109 stores this result.

(3) Finally the third color is processed. ON/OFF determiner 103 for the first color refers to the ON/OFF data of the first color at the target pixel, the data has been stored in memory 108. Then ON/OFF determiner 110 for the second color refers to the ON/OFF data of the second color at the target pixel, this data has been stored in memory 109. (a) When either one of the first color or second color is ON, error diffusion device 102 assigns the third color to OFF free from the diffusion process, and outputs an OFF signal. (b) When both the first and second colors are OFF, the third color undergoes a usual error diffusion process, i.e. error data weighting by calculator 104, and binary coding by coding means 105 are provided, then the result is output as a binary signal.

The process in the second embodiment is further detailed with reference to the flowchart shown in FIG. 3.

Figure 3:
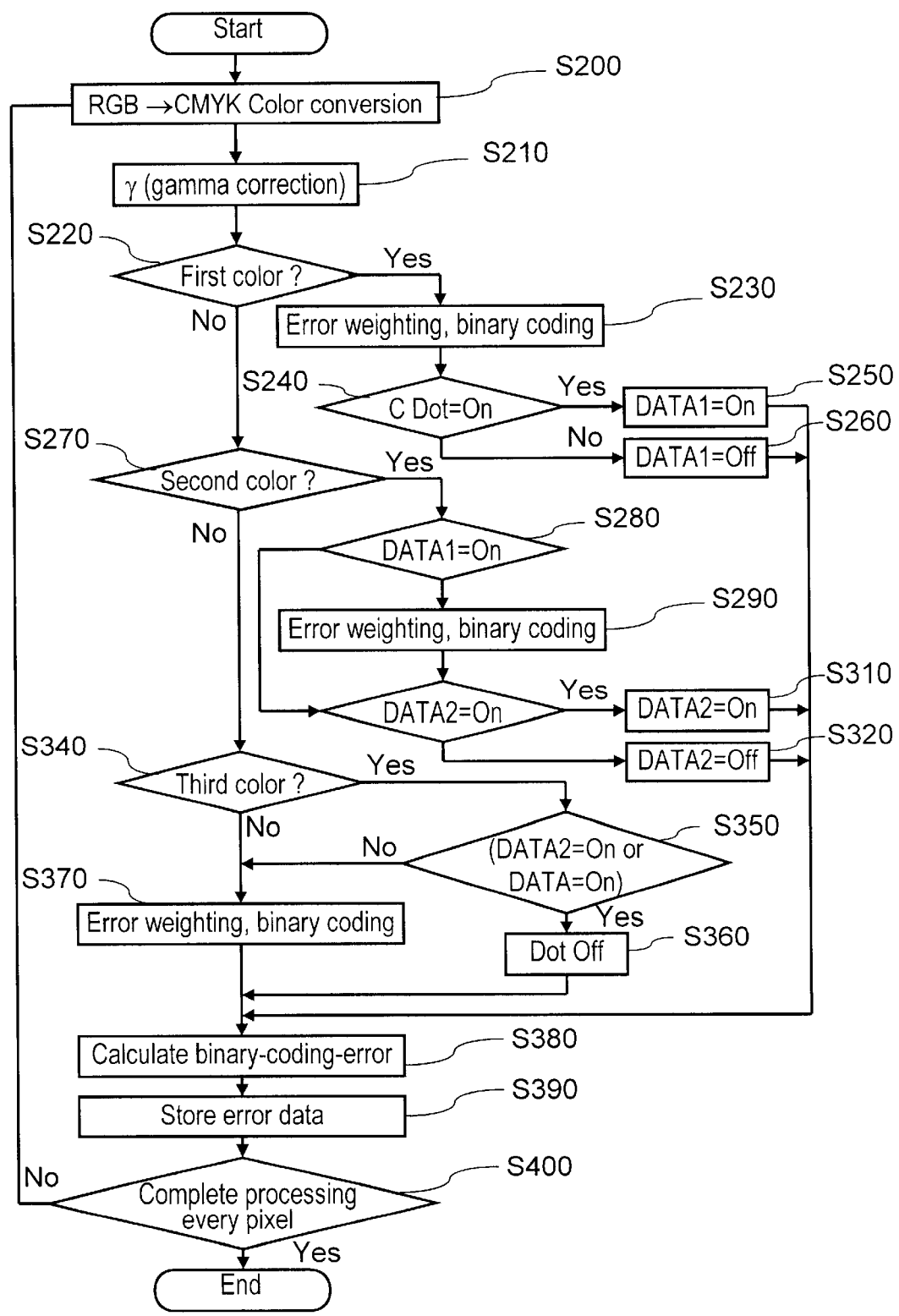
FIG. 3 is a flowchart depicting a process in accordance with a second exemplary embodiment of the present invention.

In FIG. 3, an image data of the target pixel undergoes color conversion from R, G, B to C, M, Y, K. (Step s200)

Then, the converted image data undergoes γ(gamma) correction so that the data is corrected to be responsive to color reproducibility of an output device. (Step s210)

The corrected data undergoes binary coding in the order of C, M, Y and K. The processes of first, second and third colors, i.e. C, M, Y, are described hereinafter.

(1) First, the First Color is Processed. (Step s220)

Based on error data of the pixels around the target pixel, error data weighting is provided to the target pixel, and then binary coding is provided by comparing with a threshold value. (Step s230)

Determine whether the binary coding results in ON or OFF. (Step s240)

When the result is ON, assign data 1, i.e. ON/OFF data of the first color, to ON. When the result is OFF, assign data 1 to OFF.

Next, calculate errors produced at the binary coding process (Step s380), then, store the error data. (Step s400)

(2) Next, the Second Color is Processed. (Step s270) Refer to the binary coded result of the first color. (Step s280) When data 1 is ON, assign data 2, i.e. ON/OFF data of the second color, to OFF, and output data 2 as OFF data. When data 1 is OFF, provide data 2 with error-data weighting, and then provide data 2 with the binary coding by comparing with the threshold value. Then, calculate binary coding errors. (Step s380), and store the error data. (Step s390)

(3) Finally the Third Color is Processed. (Step s340)

Refer to the binary coded results of the first and second colors using data 1 and data 2 of respective ON/OFF data. (Step s350)

When either one of results is ON, outputs OFF as the binary coded result of the third color. (Step s360) When both the results of first and second colors are OFF (Step s350), provide the third color with the error-data-weighting, and then provide it with the binary coding by comparing with the threshold value. Then, calculate binary coding errors (Step s380), and store the error data (Step

Exemplary Embodiment 3

The third embodiment describes the case where an input image includes black (K) in addition to C, M, Y.

The third embodiment takes an example where binary coding results in K to be ON at a pixel, and C, M, Y are output as OFF at the pixel.

Figure 4:
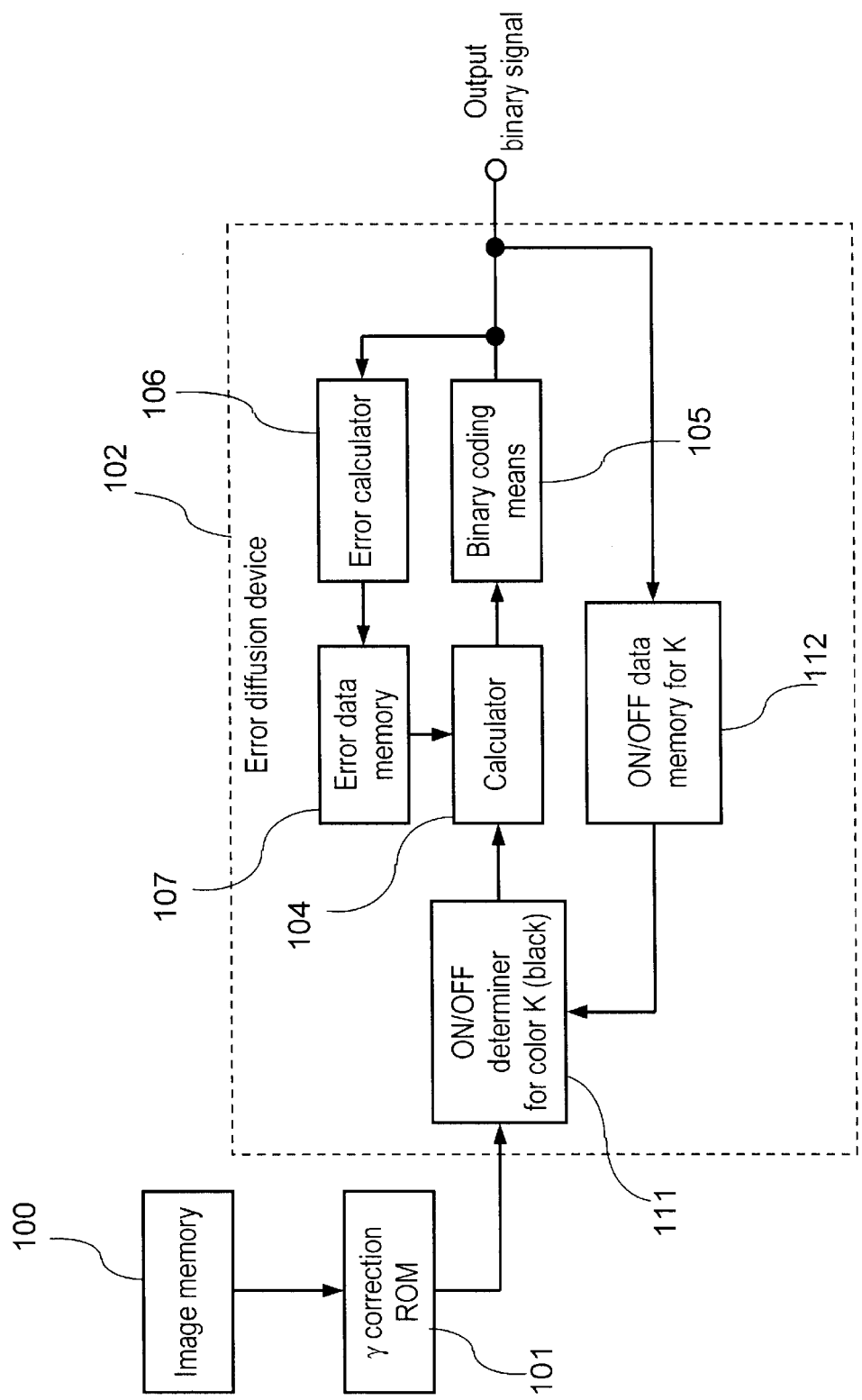
FIG. 4 is a block diagram illustrating the structure of an error diffusion device in accordance with a third exemplary embodiment of the present invention.

FIG. 4 is a block diagram where the third embodiment is practiced.

In error diffusion device 102, ON/OFF determiner 111 for the binary- coded K and memory 112 for storing binary-coded result of K are added to the elements shown in FIG. 1.

Determiner 111 refers to the data stored in memory 112, and determines whether a binary-coded result of K is ON or not at a target pixel.

An error diffusion process in the construction discussed above is detailed hereinafter.

(1) First, color K at the target pixel is binary coded in the following manner. First, provide K with the binary coding in the following procedure. During this process, processes by determiners 111 can be omitted. In the first place, K data of a target pixel undergoes error weighting. At this moment, error data of pixels around the target pixel are referred to. Those error data have been stored in error data memory 107 by error weighting calculator 104. The weighted data then undergoes the binary coding through binary coding means 105 based on a given threshold value. Error calculator 106 calculates binary coding errors produced in this process. The calculated errors are stored in memory 107. The result of binary coding of K is stored in memory 112 as ON/OFF data.

(2) Next, C, M, Y are binary coded in the following manner. Determiner 111 refers to the ON/OFF data of K stored in memory 112. When K is ON, error data of pixels around the target pixel are referred to. Those error data have been stored in error data memory 107 by error weighting calculator 104. The error-data-weighting is provided to C,M,Y data of the target pixel. Binary coding means 105 outputs OFF without comparing the weighted data with the threshold value and free from the binary coding process. Error calculator 106 calculates the errors of OFF output. Error memory 107 stores the calculated errors.

Exemplary Embodiment 4

Figure 5:
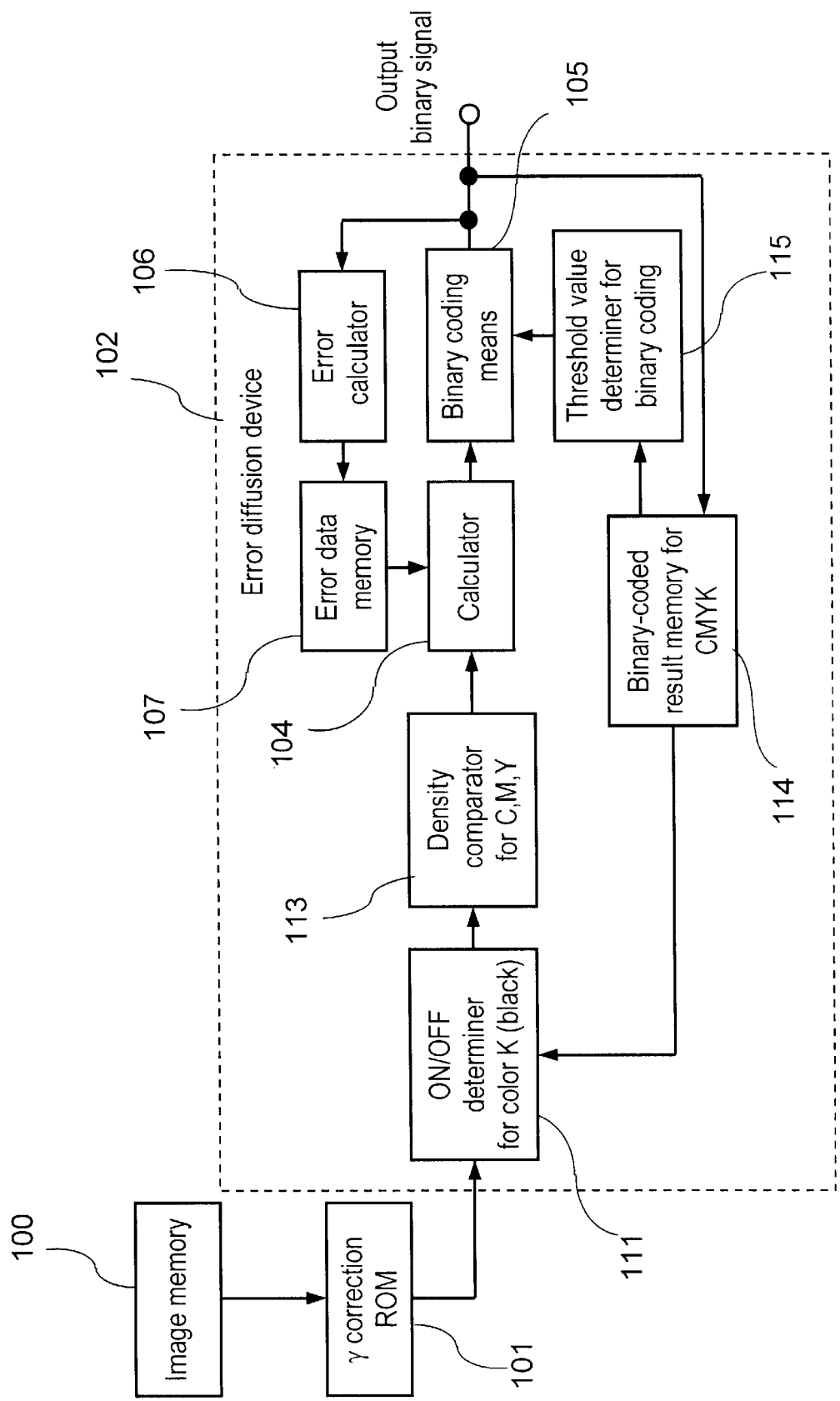
FIG. 5 is a block diagram illustrating the structure of an error diffusion device in accordance with a fourth exemplary embodiment of the present invention.

The fourth embodiment of the present invention is described hereinafter with reference to FIG. 5.

This embodiment describes the case where an input image includes color K in addition to C, M, Y, and binary coded result of K at a target pixel is OFF. FIG. 5 differs from FIG. 4 in the following points.

i) the following two elements are added, i.e. density comparator 113 for comparing the densities of C, M, Y and determining the density order, and threshold value determiner 115 for determining threshold values for binary coding C, M, Y.

ii) Memory 112 for storing binary coded result of K is replaced with memory 114 for storing binary coded results of C, M, Y and K at a target pixel.

The error diffusion process in the structure discussed above in accordance with the fourth embodiment is detailed hereinafter.

(1) First, provide color K with the binary coding in the following procedure. During this process, processes by determiners 111 and comparator 113 can be omitted. In the first place, K data of a target pixel undergoes error weighting. At this moment, error data of pixels around the target pixel are referred to. Those error data have been stored in error data memory 107 by error weighting calculator 104. The weighted data then undergoes the binary coding through binary coding means 105 based on a given threshold value. Error calculator 106 calculates binary coding errors produced in this process. The calculated errors are stored in memory 107. Then the result of binary coding of K is stored in memory 114 as ON/OFF data.

(2) Next, C, M, Y are binary coded in the following manner. In the first place, determiner 111 refers to the ON/OFF data of K at the target pixel stored in memory 108. Since the binary coded result of K is set OFF in this case, comparator 113 compares the densities of C, M, Y, and the binary coding through error diffusion is provided to the highest density color and the followers in this order. The highest density color is referred to as a first color, the color next to the highest is referred to as a second color, and the lowest density color is referred to as a third color hereinafter.

First, error weighting calculator 104 refers to error data of the pixels around the target pixel, and provides the first color with the error weighting. The error data have been stored in memory 107. Binary coding means 105 refers to a threshold value determined by determiner 115, and provides the first color with the weighted binary coding.

Threshold determiner 115 refers to respective ON/OFF information of C, M, Y, and determines a threshold value so that there are little chances for dots to be overlaid. The respective ON/OFF information have been stored in memory 114.

Based on the information of binary coded output, error calculator 106 calculates error data. Error memory 107 stores the calculated error data. Memory 114 stores the binary coded result of the first color as ON/OFF information of the dot.

(3) Error diffusion device 102 provides the second color and the third color with the binary coding in this order with the same manner as it did for the first color. First, error weighting calculator 104 refers to error data of the pixels around the target pixel, and provides the second and third colors with the error weighting. The error data have been stored in memory 107. Binary coding means 105 refers to a threshold value determined by determiner 115, and provides the second and third colors with the weighted binary coding.

Threshold determiner 115 refers to ON/OFF information of the first color, and determines a threshold value so that there are little chances for dots to be overlaid. When the first color has resulted in ON, the threshold value is determined so that the second color can have a lot of chances to be OFF.

Based on the information of binary coded output, error calculator 106 calculates error data. Error memory 107 stores the calculated error data. Memory 114 stores the binary coded results of the second and third colors as ON/OFF information of the dot.

Threshold value determiner 115 determines threshold values so that respective colors can avoid overlaying with each other at ON status. The flowchart shown in FIG. 7 details how to determine the threshold values by determiner 115.

Figure 6:
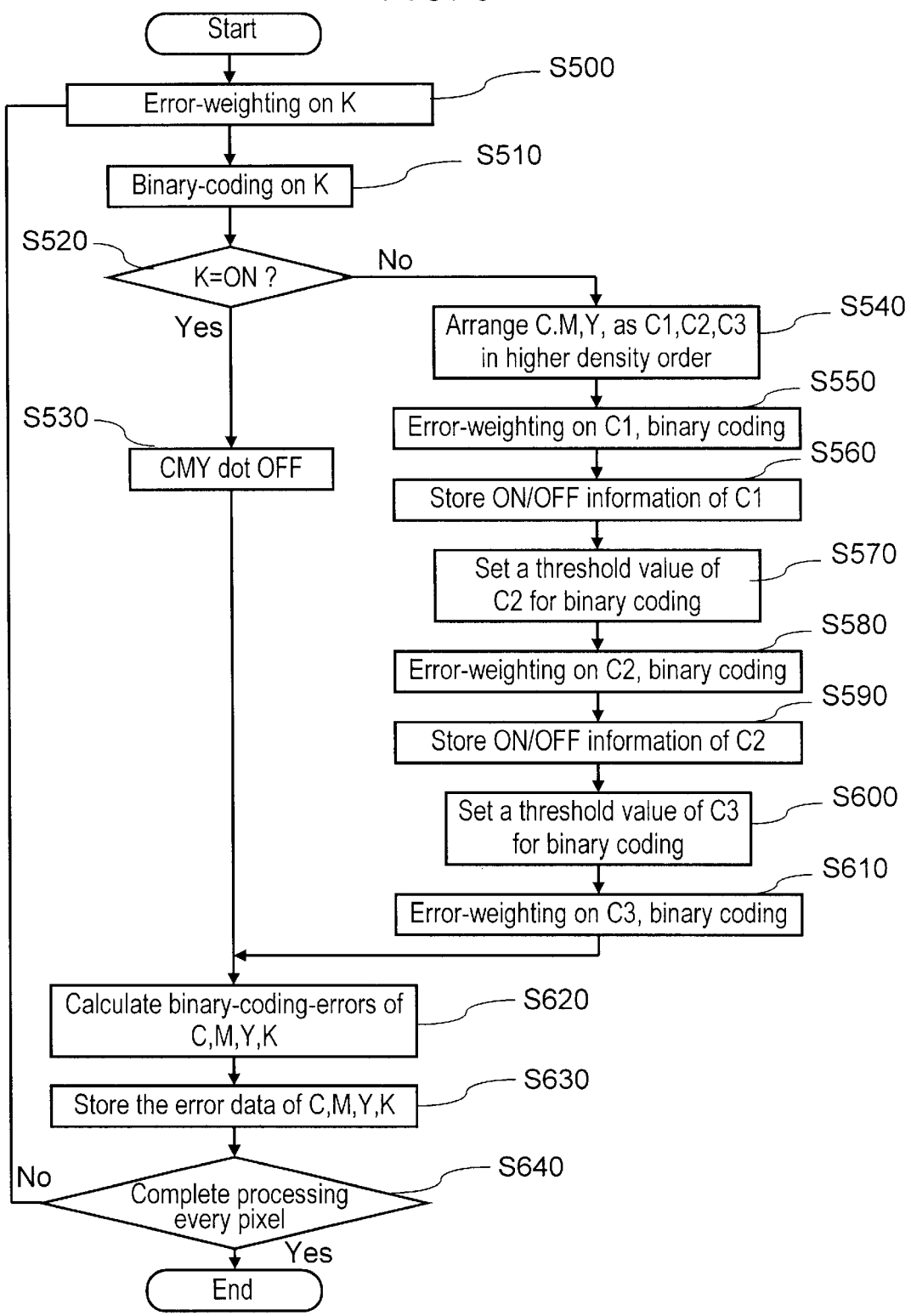
FIG. 6 is a flowchart depicting the process in accordance with the third and fourth embodiments of the present invention.

The process by error diffusion device 102 in accordance with the third and fourth embodiments is further detailed with reference to the flowchart shown in FIG. 6.

First, provide the error-weighting to K by referring to error data of the binary coded pixel in an error matrix (Step s500).

Next, provide the binary coding to K based on a default threshold value, and obtain ON/OFF data of K (Step s510).

When K is ON (Step s520), output the binary coded C, M, Y at OFF status (Step s530). Calculate respective error data from the binary coded results of C, M, Y and K (Step s630).

Then, store the calculated error data into error memory (Step s640).

When K is OFF (Step s520), compare the densities of C, M, Y with each other, and name each density C1, C2 and C3 in this order from the highest density to the lowest (Step s540).

Next, the color C1 is provided with error-weighting, and then the weighted color is binary coded by comparing with the default threshold value (Step s550).

Store the binary coded result of C1 as ON/OFF information (Step s560).

Then, color C2 undergoes the binary coding process. Set a threshold value for C2 responsive to the binary coded result of C1 (Step s570).

The threshold value is set as follows: When C1 is ON after binary coding, the threshold value is set so that C2 can have a lot of chances to be OFF by the binary coding. When C1 is OFF, the threshold value is set so that C2 can have a lot of chances to be ON.

The error weighted C2 undergoes the binary coding by using the threshold values set as discussed above (Step s580).

Store the binary coded result of C2 as ON/OFF information (Step s590).

Finally, provide the binary coding to C3, the lowest density color. First, set a threshold value responsive to the binary coded results of C1 and C2 (Step s600). The threshold value is set as follows: When C1 is ON after binary coding, the threshold value is set so that C3 can have a lot of chances to be OFF by the binary coding. When C1 is OFF, the threshold value is set so that C3 can have a lot of chances to be ON.

Further, when C2 is ON after binary coding, the threshold value is set so that C3 can have the more chances to be OFF by the binary coding. When C2 is OFF, the threshold value is set so that C3 can have the more chances to be ON.

The error weighted C3 undergoes the binary coding by using the threshold values set as discussed above (Step s610).

After the processes discussed above, calculate binary-coding-errors of respective colors at the target pixel based on ON/OFF information of the binary coded C, M, Y, and K (Step s620).

Store the resultant error data of respective colors in the error memory (Step s630). Refer to these error data for error weighting when the next pixel undergoes the binary coding.

All the processes discussed above are provided to every pixel, thereby producing a binary-coded-image (Step s640).

Exemplary Embodiment 5

The fifth embodiment of the present invention is described hereinafter with reference to FIG. 7. This embodiment provides binary coding to K, M, C, Y respectively in this order at a target pixel.

Figure 7:
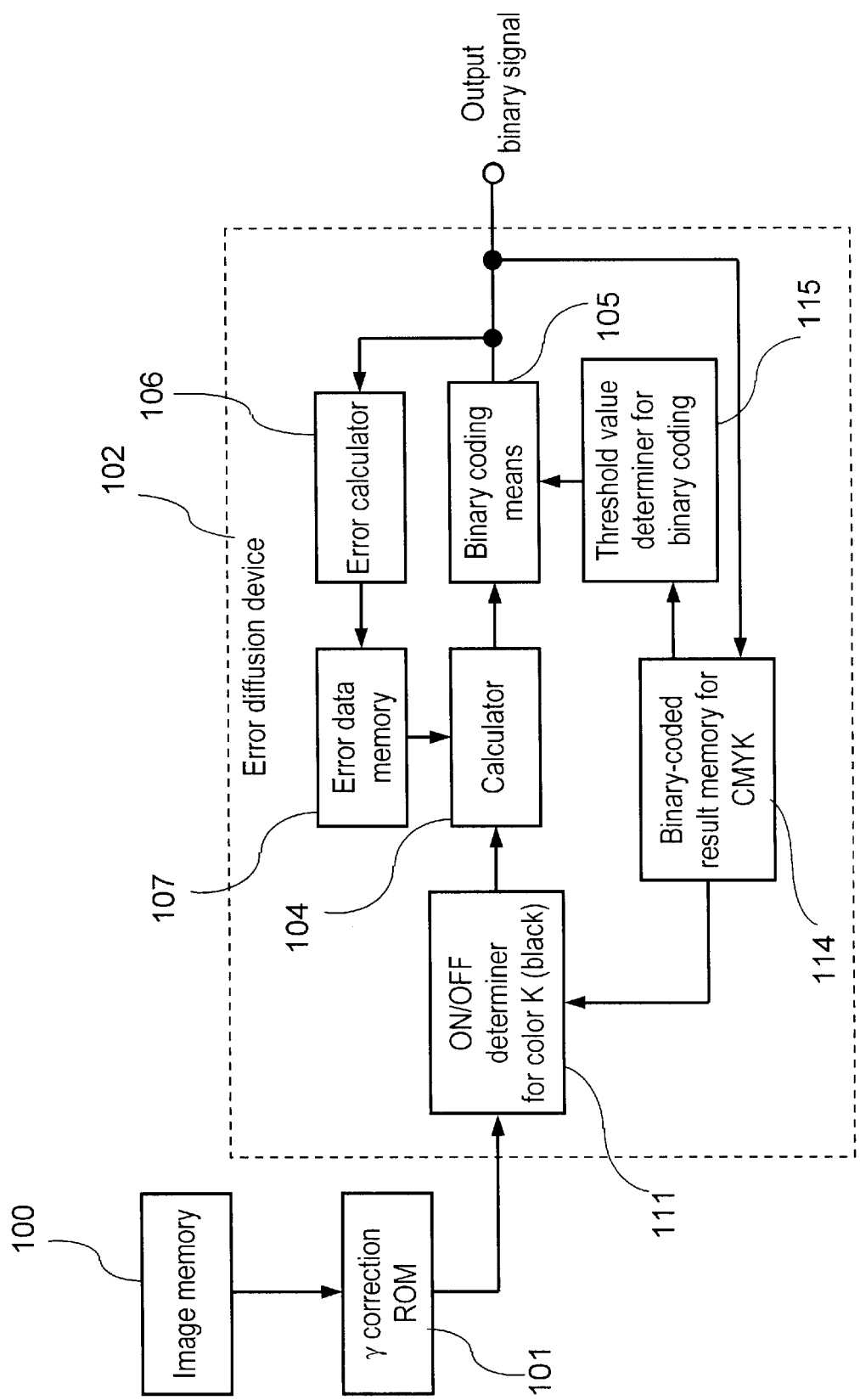
FIG. 7 is a block diagram illustrating the structure of an error diffusion device in accordance with a fifth exemplary embodiment of the present invention.
Figure 8:
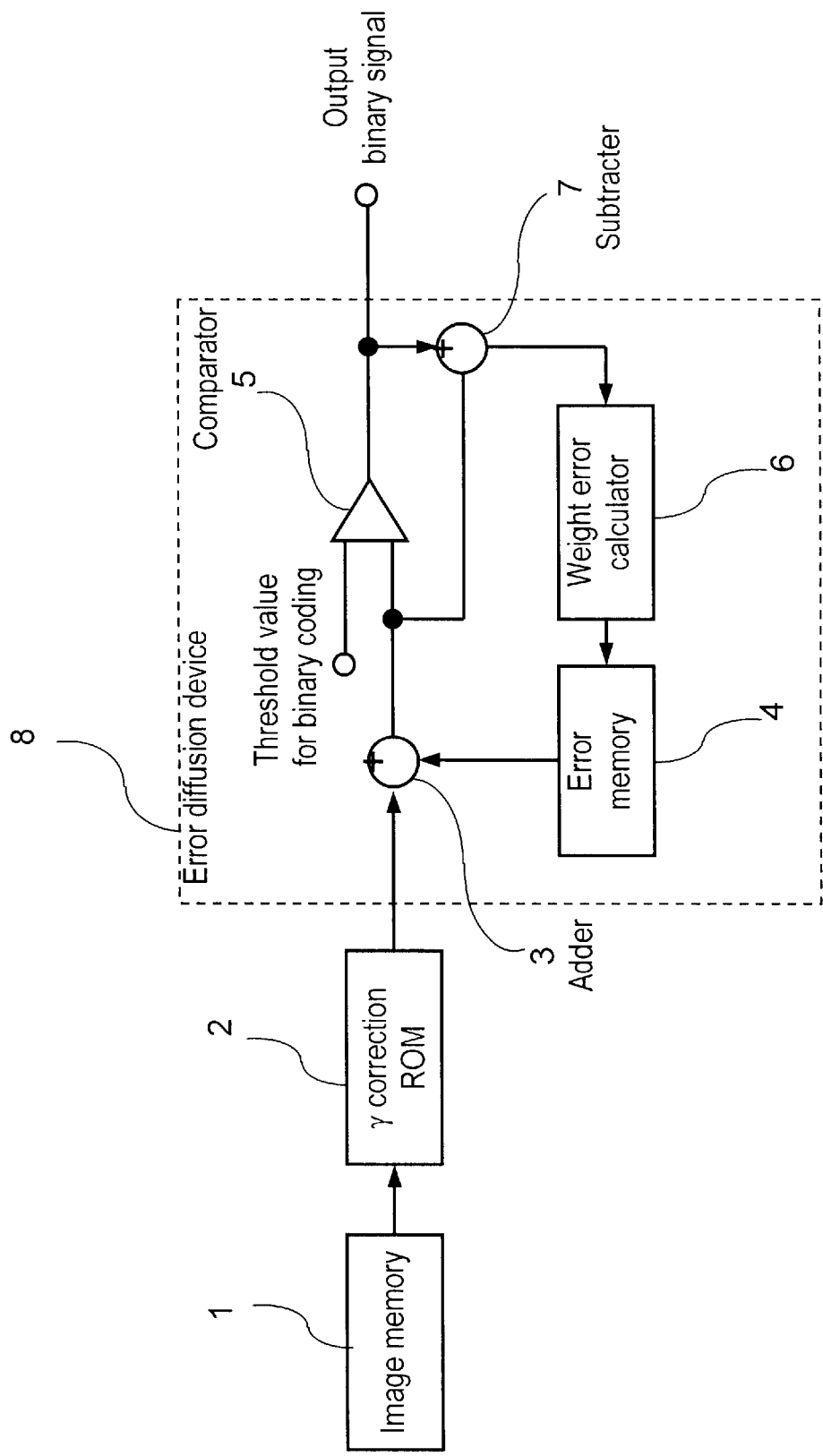
FIG. 8 is a block diagram illustrating a binary coding process by a conventional error diffusion device.

FIG. 7 differs from FIG. 5 in the following points.

i) Density comparator 113 for C, M, Y is removed.

ii) ON/OFF determiner 111 for K is directly connected to error weighting calculator 104.

Error diffusion device 102 provides color K with the same process as it did in the third and fourth embodiments.

(1) When color K (black) results in OFF by the binary coding, the same process as in the fourth embodiment are provided to M, C, Y in this order, namely, the order of higher to lower visual sensitivity.

(2) When K results in ON, respective colors M, C, Y successively undergo the binary coding in this order. At this time, threshold-value-determiner 115 sets threshold values so that M, C, Y can have a lot of chances to result in OFF.

Exemplary Embodiment 6

The sixth embodiment of the present invention is described hereinafter with reference to FIG. 7.

This embodiment provides binary coding to K, M, C, Y respectively in this order at a target pixel. Error diffusion device 102 provides color K with the same process as it did in the third and fourth embodiments.

(1) When color K (black) results in OFF by the binary coding, the same process as in the fourth embodiment are provided to M, C, Y in this order, namely, the order of higher to lower visual sensitivity.

(2) When K results in ON, respective colors M, C, Y in this order undergo the binary coding in the same manner as provided in the third embodiment, and they result in OFF.

The all six embodiments discussed above described the binary coding method using the error diffusion method. Other binary coding methods, such as screening and which display halftones in a pseudo manner, can employ the methods described in the first, second and third embodiments. Regarding the fourth and fifth embodiments, if a binary coding table in which threshold values are set is added so that a plurality of colors are prevented from being output as the same coordinates, the screening or dithering method could be employed.

The present invention can thus improve quality and granularity of an image. The embodiments 1, 2, 3, 4 and 6 proves that intermediate processes in a pseudo manner, such as error-weighting and binary coding, can be eliminated in the case where a color firstly binary coded results in ON and the following colors are processed to result in OFF. The present invention thus alleviates the load on process and reduces the process time.

The third embodiment proves that the present invention can prevent color overlay, i.e. dots of C, M, Y are overlaid by K, thereby canceling respective colors and encountering color overlay. As a result, the present invention can produce a quality binary gradation image where color overlay is restrained.

The fifth and sixth embodiments prove that the present invention can produce a higher quality binary-gradation-image by providing the binary coding to K, M, C, Y in this order, i.e. the order of higher to lower visual sensitivity.

What is claimed is:

1. A method of binary coding a multi-gradation input image, said method comprising the steps of:
   (a) binary coding a first color corresponding to a target pixel so that at said target pixel said first color is one of ON and OFF; and
   (b) binary coding a second color at said target pixel to OFF if said first color has been binary-coded to ON, the first color being black and being represented by K, and when K is binary coded to OFF, each of a plurality of remaining colors to be binary coded is processed one by one in an order of highest to lowest density, the order of highest to lowest density being determined based on an input image including each of the remaining colors,
   when a color that is processed following K is binary coded to ON, a threshold value above which remaining colors are binary coded to OFF is decreased for each of the then remaining colors to be binary coded, and
   when the color that is processed following K is binary coded to OFF, a threshold value above which at least one of the remaining colors is binary coded to ON is decreased for each of the then remaining colors.

2. A method of binary coding a multi-gradation input image, said method comprising the steps of:
   (a) binary coding a first color corresponding to a target pixel so that at said target pixel said first color is one of ON and OFF; and
   (b) binary coding a second color at said target pixel to OFF if said first color has been binary-coded to ON, said first and second color being included in a plurality of colors which include black (K), cyan (C), magenta (M) and yellow (Y),
   K being binary coded first, and then M, C and Y are binary coded one by one in an order of highest to lowest visual sensitivity,
   when K is binary coded to ON, a first threshold value for binary coding remaining colors to OFF is decreased for each of the remaining colors,
   when k is OFF and M is ON, a second threshold value for binary coding C and Y to OFF is decreased, and
   when M is binary coded to OFF, a third threshold value is decreased for one of C and Y to be coded to ON.

3. A method of binary coding a multi-gradation input image, said method comprising the steps of:
   (a) binary coding a first color corresponding to a target pixel so that at said target pixel said first color is one of ON and OFF; and
   (b) binary coding a second color at said target pixel to OFF if said first color has been binary-coded to ON, the first and second color being included in a plurality of colors which comprises black (K), cyan (C), magenta (M) and yellow (Y),
   K being binary coded first, and then M, C and Y are binary coded one by one in an order of highest to lowest visual sensitivity, when K is binary coded to ON, each of the remaining colors is binary coded to OFF, when K is binary coded to OFF and M is binary coded to ON, a threshold value for binary coding C and Y to OFF is decreased, and when M is binary coded to OFF, a threshold value for binary coding one of C and Y to ON is decreased.

4. An apparatus for binary coding a multi-gradation input image having a plurality of colors, said apparatus comprising:

(a) a binary coding apparatus for binary coding a first color which corresponds to a target pixel;

(b) first determining means for evaluating the binary coding of said first color corresponding to said target pixel and for indicating that a second color corresponding to said target pixel should be coded to OFF if said first color for said target pixel is coded to ON;

(c) a density comparator for comparing densities of respective colors using input images including the respective colors; and (d) threshold value determining means for determining a threshold value for binary coding a color, the plurality of colors includes a black color that is represented by K, and K is binary coded first, and when K is binary coded to OFF densities of the other colors included in the input images are compared by said comparator, the other colors being binary coded and processed one by one beginning with a color having the highest density, and binary coded results of K and the other colors are stored in a first memory, the binary coded results of K and the other colors being determined by said first determining means, when a color processed following K has been coded to ON, a threshold value for binary coding other colors to OFF is decreased, and when the color processed following K is coded to OFF, a threshold value for binary coding at least one of remaining colors to ON is decreased.

5. An apparatus for binary coding a multi-gradation input image having a plurality of colors, said apparatus comprising:

(a) a binary coding apparatus for binary coding a first color which corresponds to a target pixel;

(b) first determining means for evaluating the binary coding of said first color corresponding to said target pixel and for indicating that a second color corresponding to said target pixel should be coded to OFF responsive to said first color of said target pixel being coded to ON; and (c) threshold value determining means for determining a threshold value for binary coding a color, the plurality of colors comprising black (K), cyan (C), magenta (M) and yellow (Y), K being binary coded first, and then M, C and Y being binary coded one by one in an order of highest to lowest visual sensitivity and a first memory stores results of the binary coding, said first determining means determining the binary coding results of colors K, C, M and Y, when K is binary coded to ON, a threshold value for binary coding remaining colors to OFF is decreased, when K is binary coded to OFF and M is binary coded to ON, a threshold value for binary coding C and Y to OFF is decreased, and when M is binary coded to OFF, a threshold value for binary coding one of C and Y to ON is decreased.

6. An apparatus for binary coding a multi-gradation input image having a plurality of colors, said apparatus comprising:

(a) a binary coding apparatus for binary coding a first color which corresponds to a target pixel;

(b) first determining means for evaluating the binary coding of said first color corresponding to said target pixel and for indicating that a second color corresponding to said target pixel should be coded to OFF responsive to said first color of said target pixel being coded to ON; and (c) threshold value determining means for determining a threshold value for binary coding a color, the plurality of colors comprising black (K), cyan (C), magenta (M) and yellow (Y), K being binary coded first, and then M, C and Y being binary coded one by one in an order of highest to lowest visual sensitivity, and a first memory stores results of the binary coding, said first determining means determining the binary coding results of colors K, C, M and Y, when K is binary coded to ON, remaining colors are binary coded to OFF, when K is binary coded to OFF and M is binary coded to ON a threshold value for binary coding C and Y to OFF is decreased, and when M is binary coded to OFF, the threshold value for binary coding one of C and Y to ON is decreased.

* * * * *